United States Patent [19]

Davenport

[11] 3,829,748

[45] Aug. 13, 1974

[54] TAPE DRIVE D.C. MOTOR CONTROL SYSTEM

[75] Inventor: Raymond A. Davenport, Okemah, Okla.

[73] Assignee: Oktronics, Inc., Okemah, Okla.

[22] Filed: Aug. 30, 1972

[21] Appl. No.: 284,768

[52] U.S. Cl. .................. 318/257, 318/291, 318/295, 242/75.51

[51] Int. Cl. .............................................. H02p 1/22

[58] Field of Search ........... 318/696, 685, 663, 674, 318/295, 293, 291, 257; 226/113, 10; 179/100.2; 242/75.51, 190; 178/17 B, 17 E

[56] References Cited

UNITED STATES PATENTS

| | | | |
|---|---|---|---|
| 2,985,396 | 5/1961 | Johnson | 242/75.51 |
| 3,022,454 | 2/1962 | Millis | 318/257 |
| 3,318,546 | 5/1967 | Bejach | 242/75.51 |
| 3,318,547 | 5/1967 | Bejach | 242/75.51 |
| 3,672,600 | 6/1972 | Carlson | 242/75.51 |
| 3,753,065 | 8/1973 | Chiles | 318/295 |

*Primary Examiner*—G. R. Simmons
*Attorney, Agent, or Firm*—Head & Johnson

[57] ABSTRACT

This invention describes an improved electronic circuit for driving a DC motor which is used for reeling and unreeling tape in a perforated paper tape reader-handler. The tape is unreeled from the reel to a roller on a dancer arm. The rotation of the dancer arm rotates a potentiometer. In accordance with the angle and direction of rotation from a nominal midposition, an increasing positive or negative voltage is applied to an amplifier which drives the DC motor through a power amplifier in one direction or the other.

1 Claim, 3 Drawing Figures

TAPE DRIVE D.C. MOTOR CONTROL SYSTEM

BACKGROUND OF THE INVENTION

This invention lies in the field of data storage systems. More particularly it concerns the tape handling in a perforated tape reader-handler so as to provide a minimum load on the sprocket wheel drive that controls the movement of the tape on the reading heads.

In the prior art the control of the DC motors which are used to wind take on and remove tape from a tape reel, have normally been controlled by limit switches which are controlled by rotation of a dancer arm looped into the tape system. This provides a socalled "bang-bang" or on-off system of control for the motors requiring gear redirection head or brake-clutch system. Such controls not only provide inertia effects and may cause mechanical damage to the tape, but they also involve heating and possibly over-voltages to the motors and additional wear items.

It is an important object of this invention to provide a motor drive system which utilizes a variable drive voltage in accordance with the error position of the dancer arm. When the dancer arm is widely out of position the motor receives a higher driving voltage, which causes a high velocity of tape movement. When the dancer arm is near its nominal midposition, the drive motor operates at relatively low velocity.

SUMMARY OF THE INVENTION

The above objects are realized and the limitations of the prior art are overcome in this invention by the use of an amplifier system responsive to rotation of a moving contact on a potentiometer. The potentiometer is connected to the dancer arm which is normally held in its midposition, which places the slider in its midposition of the potentiometer. A positive voltage is applied to one end of the potentiometer and a negative voltage to the other so that when the slider is in the midposition the slider voltage is nominally zero. As the dancer arm rotates clockwise or counterclockwise the voltage increases in a positive direction or a negative direction, so as to control the rotation of the motor. The motor is a permanent magnet motor, and so responds to positive and negative voltages by reverse directions of rotation.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENTS

Figure 2:
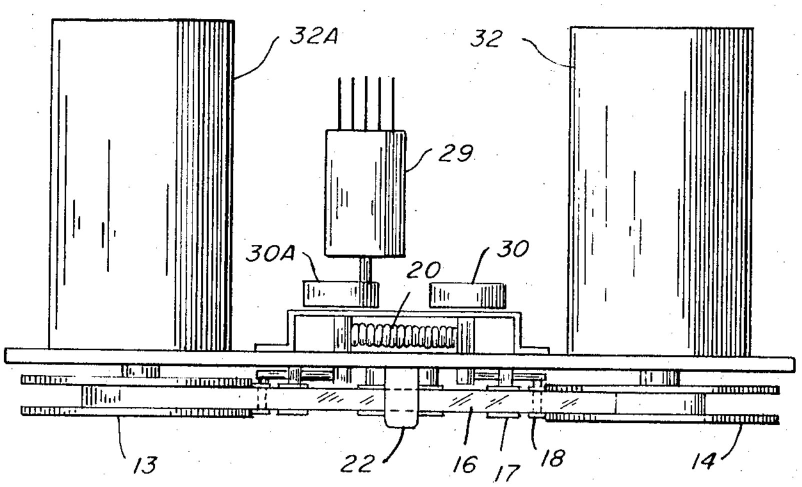
FIGS. 1 and 2 show plan and elevation views of a generalized paper tape reader-handler system to which the improvements of this invention could be applied.
Figure 1:
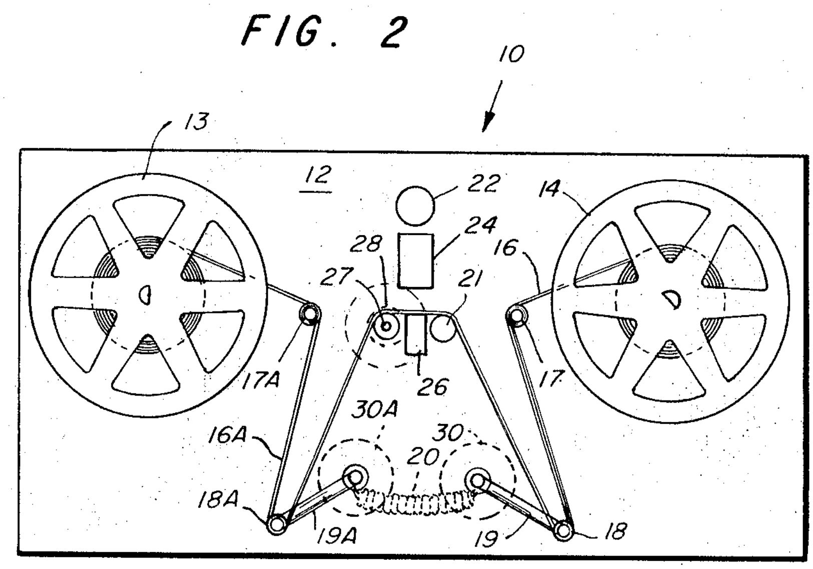

Referring now to FIGS. 1 and 2, there is shown a tape deck indicated generally by numeral 10. This includes a panel 12 on which are mounted a number of devices which are utilized in the tape handling and reading operation. There are two reels 13 and 14 which are mounted on the shafts of motors 32A and 32 respectively, which are positioned behind the panel 12. The tape is reeled off of supply reel 14 and goes around a fixed roller 17 and around a roller 18 which is supported on a dancer arm 19. The dancer arm is mounted for rotation with the shaft of a potentiometer 30 mounted behind the panel 12.

The tape then goes to the tape reading apparatus, namely the light source 22, the optics 24 and the photoelectric readers 26. There is a shaft 27 with a step motor 29 mounted behind the panel. This motor drives a sprocket wheel 28 mounted on the shaft 27. The sprocket wheel engages a longitudinal column of perforations in the paper tape which are spaced one-tenth inch apart. There are 24 teeth on the sprocket such that a rotation of one twenty-fourth of a revolution, or 15°, will move the tape one tooth spacing or one-tenth inch. The tape then goes around a roller 18A on a second dancer arm 19A which is connected to and drives a second potentiometer 30A. The two dancer arms are connected by a spring in such a way that both of them are urged downwardly so as to keep the tape looped around the rollers 18 and 18A in proper tension. The tape now designated 16A goes around the additional fixed idler 17A and is wound up on the reel 13 which is driven by the motor 30A.

Exact details of the tape reading system are not important to this invention which concern simply the reel drive motors 32 and 32A which serve in conjunction with the potentiometer 30 and 30A to keep the loops of tape in such condition that the dancer arms 19 and 19A are in their approximate midposition.

As the tape is advanced by means of the sprocket 28, the loop around the roller 18 tightens and the dancer arm 19 is lifted. This causes the potentiometer to put out a voltage in such a direction so as to rotate the reel 14 in a counterclockwise direction to provide more tape, so as to permit the dancer arm to go back down to its midposition. On the other hand if the tape is run backwards by turning the sprocket in the reverse direction so as to rewind the tape onto reel 14, then there will be more tape in the loop around roller 18 than is required and the dancer arm 19 will drop to a lower position. This will provide on the slider a voltage of opposite polarity which will cause the motor 32 to turn in a clockwise direction to take up the slack and bring the dancer arm back to its nominal position.

The invention therefore concerns the control of the permanent magnet type motor 32 by a potentiometer 30 with a slider controlled by the dancer arm 19 so that as the tape looped around roller 18 varies and the dancer arm is urged in one direction or the other by the spring 20 or by the tape, appropriate voltages will be provided by the potentiometer to control the motor 32 to drive it in the proper direction to adjust the loop to its proper size. A similar situation operates on the reel 13 in connection with the dancer arm 19A. However, a description of one motor, reel, dancer arm, potentiometer system is all that will be needed because the other one operates in a similar manner.

In the design of the system the polarity of connection is such that when the dancer arm moves in a clockwise direction, that is, corresponding to an increased length of loop, the controlled motor 32 will operate in a corresponding clockwise direction to wind up more tape and vice versa. Thus, if the tape moves to the right the dancer arm on the right is lowered and the potentiometer shaft to which it is attached turns clockwise. The motor driving the reel on the right rotates clockwise at an angular velocity proportional to the angle of potentiometer shaft displacement from midposition. The reel driven clockwise takes up the tape thus tending to raise the dancer arm and rotate the potentiometer in a counterclockwise direction and so restore it to its midposition.

Figure 3:
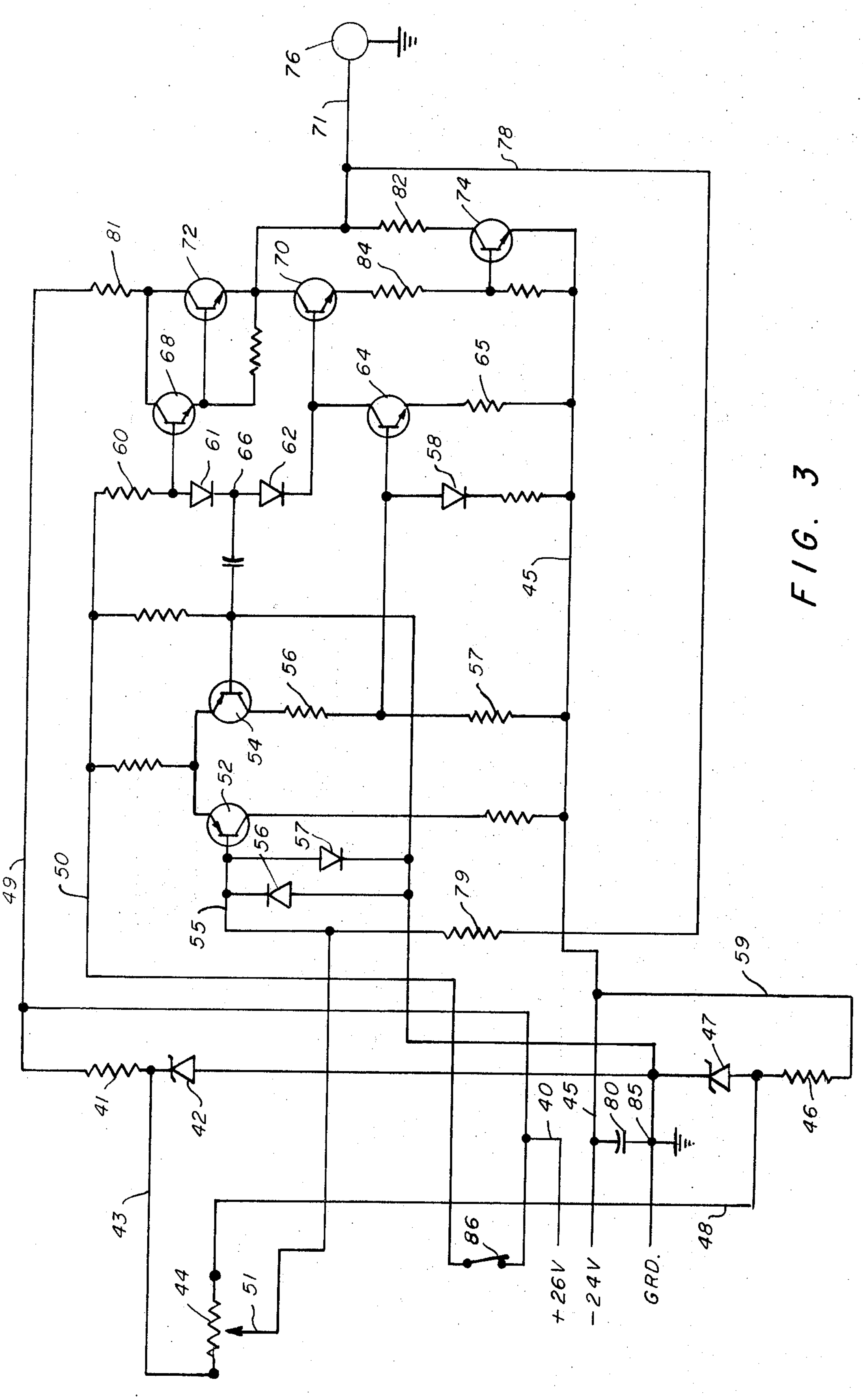
FIG. 3 is a schematic diagram of the electronic circuits which utilize the output of a potentiometer connected to the dancer arm to drive the reel motor.

Refer now to FIG. 3. There is a power supply not shown, which provides a positive voltage of 26 volts on input lead 40 and a negative voltage of 24 volts which is provided on input lead 45. There is a ground lead 85 which is tied to the negative lead by means of a condenser 80. There is an on-off switch 86. The positive voltage goes from line 40 to the line 49 to supply power to the power amplifiers 72 and 74, and through the switch 86 to line 50 to supply power to the preamplifiers.

The potentiometer 30 is shown schematically as element 44 with a slider 51. Connected to the positive voltage line 49 is a resistance 41 in series with a zener diode 42 to ground. There is a lead 59 which goes from the minus 24 volt supply through resistance 46 and through zener diode 47 which connects to ground. The controlled voltage on the junction between the resistance 41 and diode 42 goes by lead 43 to one end of the potentiometer 44, and the controlled voltage on the junction between the resistance 46 and zener diode 47 goes by lead 48 to the other end of the potentiometer. When the slider 51 is in the midpoint of potentiometer 44 there will be approximately zero volts on the slider. As it moves to the right the voltage will increase in negative polarity, and when it moves to the left there will be an increase in voltage of positive polarity.

The slider 51 connects to lead 55 which goes to the base of transistor 52. The diodes 56 and 57 connected between 55 and ground, serve as voltage limiters, to set a maximum positive and negative voltage on the base of the transistor 52. Transistor 52 is emitter coupled to grounded base amplifier stage 54. No phase inversion has occurred. A positive voltage excursion at the base of transistor 52 will cause its emitter to tend to swing positive. This will cause transistor 54 to conduct more heavily, causing a greater voltage drop on resistance 56, 57 and diode 58 so that the junction of resistance 56 and 57 will swing positive.

Series connected resistance 60, diode 61, diode 62, transistor 64, and resistance 65 form a voltage divider between the positive 26 volt lead 50 and minus 24 volt lead 45. The junction point 66 is normally at ground potential. When a possible voltage excursion is applied to the base of transistor 64 it conducts more heavily with the result that the junction 66 swings negative.

Diode 61 provides a forward voltage drop approximately equal to that across the emitter-base junction of transistor 68. Diode 62 does the same for transistor 70, with the result that when the junction 66 is at ground potential both transistors 68 and 70 are forward biased.

A negative voltage swing at the collector of transistor 64 will cause a negative voltage excursion at the bases of transistor 68 and transistor 70. Transistor 68 is an NPN transistor, and will be driven toward cut off, while transistor 70, a PNP transistor, will conduct more heavily. Power transistor 72 will be driven toward cut off, while power transistor 74 will conduct more heavily. When the currents through transistors 72 and 74 are equal, the emitter of transistor 72 is at ground potential and no current flows through the motor 76. When, as in this example, the currents are unbalanced, the difference must be supplied from ground, through the motor winding 76, and the emitter of transistor 72 achieves a negative voltage.

This negative voltage level at the motor terminal is fed back to the base of transistor 52 by means of feedback lead 78 and resistance 79, to control the gain of the amplifier. Notice that the feedback voltage is of opposite polarity to the input, providing a negative feedback, proportional gain, amplifier circuit.

Diode 61 and diode 62 provide sufficient offset to minimize dead space in the servo since with zero signal in, both driver transistors are conducting just above threshold. They therefore provide a smooth crossover characteristic. Condenser 80 shunts any high frequency transients to ground, eliminating servo jitter. Diode 58 provides temperature compensation for transistor 64, thus adapting the amplifier to a wider range of environmental condition. Diodes 56 and 57 serve as current limiters, to protect transistor 72 and 74 respectively, in the event that the motor lead 71 is shorted to ground. Resistance 84 serves as part of a voltage divider to compensate for the difference in gain between emitter follower transistor 68 and amplifier transistor 70.

In review, the slider 51 which is normally at a point of zero voltage on the potentiometer may move in either direction and its potential will increase in a positive or a negative direction, depending upon the direction of movement. The voltage on the slider 51 is then a function of the position of the dancer arm, which is an indication of the condition of the tape loop which requires adjustment by the motor drive 76. This voltage is amplified in several stages and applied to a pair of power amplifiers which serve to provide voltages of opposite polarity to the motor lead 71. The circuit permits adjustment of the dead space in the servo so that even a small movement in one direction or the other of the dancer arm will provide an immediately responsive voltage to the motor. When the amount of angular correction to the position of the dancer arm is large, the voltage to the motor is large and it responds more rapidly. This happens no matter which direction the dancer arm is displaced from its nominal midposition.

While the invention has been described in connection by the specific design of tape reader-handler, it is clear that the system involving potentiometer and dancer arm and motor can be applied to any type of tape handler system.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a perforated type reader-handler including a reel, a reel drive motor of the permanent magnet type having one winding, tape reeled on said reel and around a dancer arm means, the improvement in control means to drive said reel drive motor comprising:

a. potentiometer means responsive to the rotation of said dancer arm, the slider of said potentiometer being substantially in the center position when said dancer arm is in its nominal position;

b. a positive voltage connected to a first end of said potentiometer and a substantially equal negative voltage connected to the second end of the said potentiometer, the slider of said potentiometer connected to a preamplifier;

c. a first power amplifier connected between the motor winding and the positive potential to supply a positive potential to the motor and controlled by a positive displacement of the slider of the potentiometer, with said displacement being directly proportional to the power delivered from the amplifier to the motor;

d. a second power amplifier connected between the motor winding and the negative potential to supply negative potential to the motor and controlled by a negative displacement of the slider of the potentiometer, with said displacement being directly proportional to the power delivered from the amplifier to the motor; and e. including negative feedback from the outputs of said power amplifiers to the input of said preamplifier.

* * * * *